(12) United States Patent
Era

(10) Patent No.: US 7,945,088 B2
(45) Date of Patent: May 17, 2011

(54) STEREOSCOPIC IMAGE GENERATION APPARATUS

(76) Inventor: Kazunari Era, Kashiwa (JP)

( * ) Notice: Subject to any disclaimer, the term of this patent is extended or adjusted under 35 U.S.C. 154(b) by 1084 days.

(21) Appl. No.: 11/660,953

(22) PCT Filed: Sep. 7, 2005

(86) PCT No.: PCT/JP2005/016408
§ 371 (c)(1),
(2), (4) Date: Feb. 23, 2007

(87) PCT Pub. No.: WO2006/028125
PCT Pub. Date: Mar. 16, 2006

(65) Prior Publication Data
US 2007/0291110 A1      Dec. 20, 2007

(30) Foreign Application Priority Data

Sep. 10, 2004  (JP) .................................. 2004-264002

(51) Int. Cl.
*G06K 9/00* (2006.01)
(52) U.S. Cl. ........................................................ 382/154
(58) Field of Classification Search ........................ None
See application file for complete search history.

(56) References Cited

U.S. PATENT DOCUMENTS

| | | | |
|---|---|---|---|
| 6,111,979 A | 8/2000 | Katto | |
| 6,445,833 B1 | 9/2002 | Murata et al. | |
| 2005/0254702 A1 | 11/2005 | Era | |

FOREIGN PATENT DOCUMENTS

| | | |
|---|---|---|
| JP | A-7-296185 | 11/1995 |
| JP | A-8-287253 | 11/1996 |
| JP | A-9-161055 | 6/1997 |
| JP | A 9-289638 | 11/1997 |
| JP | A 10-051812 | 2/1998 |
| JP | A 11-008862 | 1/1999 |
| JP | A 2001-320731 | 11/2001 |
| JP | A 2002-123842 | 4/2002 |
| WO | WO 2004/019621 A1 | 3/2004 |
| WO | WO 2004019621 A1 * | 3/2004 |

OTHER PUBLICATIONS

Dec. 1, 2009 Office Action issued in Japanese Patent Application No. 2004-264002 (with translation).

* cited by examiner

*Primary Examiner* — Samir A Ahmed
*Assistant Examiner* — Fred Hu
(74) *Attorney, Agent, or Firm* — Oliff & Berridge, PLC

(57) ABSTRACT

The present invention aims to generate a stereoscopic image that appears natural when viewed by a viewer, without reduction in quality of the image.

In an apparatus for generating a stereoscopic image according to the present invention, a pixel value (G) for each of pixels (Pix) comprising an original image (IMG0) is stored in a RAM (23). A CPU (10) calculates a depth value (Z) for each of the pixels (Pix) included in the original image based on a comparison between the pixel value (G) of a target pixel Pix and a pixel value (G) of an adjacent pixel lying in the same line of the target pixel (Pix), so as to generate a stereoscopic image based on the calculated depth values (Z).

21 Claims, 8 Drawing Sheets

| Gsub-g | Gsub-r | Gsub-b | factor | G |
|---|---|---|---|---|
| 0 | 0 | 0 | 0 | 0 |
| 0 | 0 | 1 | 1 | 8 |
| 0 | 2 | 0 | 2 | 16 |
| 0 | 2 | 1 | 3 | 24 |
| 4 | 0 | 0 | 4 | 32 |
| 4 | 0 | 1 | 5 | 40 |
| 4 | 2 | 0 | 6 | 48 |
| 4 | 2 | 1 | 7 | 56 |

| Gsub-g | Gsub-r | Gsub-b | G |
|---|---|---|---|
| 0 | 0 | 0 | 0 |
| 0 | 0 | 1 | 8 |
| 0 | 1 | 0 | 16 |
| 0 | 1 | 1 | 24 |
| 1 | 0 | 0 | 32 |
| 1 | 0 | 1 | 40 |
| 1 | 1 | 0 | 48 |
| 1 | 1 | 1 | 56 | ic image generation process, wherein when a depth value stored in the depth value storing means is changed by the changing means the stereograph means performs the stereoscopic image generation process again.

STEREOSCOPIC IMAGE GENERATION APPARATUS

TECHNICAL FIELD

The present invention relates to a technique for generating an image that enables a viewer to perceive an object stereographically.

BACKGROUND

When a viewer views an image using the left eye and simultaneously views an image having a certain parallax relative to the image using the right eye, the viewer perceives the image stereographically. Techniques have been developed to generate such a 3D image (hereinafter referred to as a stereoscopic image) from two 2D images (hereinafter referred to as an original image) having parallaxes with respect to each other (see Patent Document 1, for example). In these techniques, a depth value is determined based on color saturations at each of the pixels configuring an image. Each pixel is shifted by an amount corresponding to a respective depth value, to generate a set of images. The images are synthesized to finalize a stereoscopic image.

Patent Document 1: Japanese Patent Publication JP2002-123842A (paragraph 0033 and FIG. 7)

DISCLOSURE OF THE INVENTION

Problem to be Solved by the Invention

In these techniques, however, the amount by which a pixel is shifted is determined based on a color saturation of the pixel; thus, it is not possible to generate a stereoscopic image which appears natural when perceived by a viewer of the stereoscopic image. For example, in a case where an object includes a localized portion having a high grayscale value (light color), known as a highlight, and another localized portion having a low grayscale value (dark color), known as a shadow, the portions highlight and the shadow will have different values, although all pixels included in the object should have substantially same value. As a result, a generated stereoscopic image is perceived by a viewer as unnatural, as it provides, for example, an impression that only a portion of the object is projected (or recessed) locally. In addition, a phenomenon will occur in which adjacent pixels in an original 2D image are displaced in opposite horizontal directions when a stereoscopic image is generated, depending on a depth value of the object. This phenomenon is known as 'a pixel crossing', and results in a distorted perception of a portion of the generated stereoscopic image. Occurrence of the phenomenon is especially likely to appear at a position where a number of objects overlap. At such a position distortion of the image can occur easily, thus significantly decreasing the quality of the generated image.

The present invention has been developed in view of the foregoing background, and its aim is to generate a stereoscopic image that enables a viewer to achieve a natural perception without a reduction in quality of the generated image.

Means for Solving the Problem

To address the above problem, there is provided an apparatus for generating a stereoscopic image based on an original image, by synthesizing a set of images for the left and right eye of a viewer, the apparatus comprising: pixel value storing means for storing a pixel value for each of the pixels included in the original image; determining means for determining a depth value for each of the pixels included in the original image by calculating a variation between pixel values of a pixel and its neighboring pixel(s); and stereograph means for generating a stereoscopic image based on the pixel values of the pixels determined by the determining means. For example, a depth value of a pixel is determined based on whether a pixel value of the pixel is bigger or smaller than at least one pixel value of at least one neighboring pixel lying in the horizontal (X) or vertical (Y) direction.

In the conventional technique shown in Document 1, a depth value of a pixel is determined based only on a pixel value of the pixel. However, in the present invention, a depth value of a pixel to be used is determined based on pixel values of the pixel and its neighboring pixel(s). As a result, in the present invention it is possible to generate a stereograph image that enables a viewer to perceive a more natural sense of depth in comparison with the conventional technique.

In a preferred embodiment, each of the pixels included in an original image includes a plurality of subpixels having different colors, and the apparatus further comprises: subpixel value storing means for storing values of the subpixels for each of the pixels; and calculating means for calculating a pixel value for each of the pixels based on a value of the respective pixels stored in the subpixel value storing means, wherein the pixel value storing means stores a pixel value calculated by the calculating means for each of the pixels. According to this embodiment, since a pixel value is calculated based on pixel values of subpixels of the pixel, a generated stereoscopic image provides a viewer with a natural sense of depth when the original image is a color image (i.e. an image included in multiple colors).

In another preferred embodiment, the calculating means binarizes a plurality of subpixels of a pixel and obtains a weighted average of the binarized values, to calculate a pixel value of the pixel based on the weighted average. In this embodiment, a pixel value of a pixel is calculated based on weighted values of subpixel values of the pixel; thus, it is possible to generate a stereoscopic image which is adapted to human opto-characteristics, reflecting sensitivity to differences in color components.

Specifically, the opto-characteristics represent that the sensitivity to green is highest and the sensitivity to blue is lowest. In view of the opto-characteristics, according to yet another preferred embodiment, each of the pixels includes subpixels of red, green, and blue; and the calculating means puts a first weight on a binarized red subpixel of a pixel, a second weight on a binarized green subpixel of the pixel, and a third weight on a binarized blue subpixel of the pixel and adds the weighted values, to calculate a pixel value of the pixel based on the added values, the second weight being smaller than the first weight, and the third weight being smaller than the second weight.

In yet another preferred embodiment, the apparatus further comprises a depth value storing means for storing a depth value for each of the plurality of pixels, wherein the determining means comprises: selecting means for sequentially selecting a plurality of pixels included in the original image in accordance with an arrangement of the plurality of pixels; difference calculation means for sequentially calculating a difference between pixel values of a pixel selected by the selecting means and a pixel adjacent to the selected pixel; and changing means for changing a depth value stored in the depth value storing means, based on the difference calculated by the calculating means, wherein when a pixel is selected by the selecting means the stereograph means performs a stereographic processing for the pixel based on a depth value of the pixel, which is stored in the depth value storing means.

In yet another preferred embodiment, when the difference changes from positive to negative, the changing means subtracts a predetermined value from a depth value of a pixel which is selected after the change occurs, and when the difference changes from negative to positive, the changing means adds the predetermined value to the depth value of a pixel which is selected after the change occurs.

In yet another preferred embodiment, the apparatus further comprises a threshold storing means for storing a threshold, wherein the determining means includes a counting means for counting a number of pixels whose pixel values are determined to be smaller than the pixel value of the selected pixel, the pixels lying in the prescribed direction; and wherein the changing means compares a count determined by the counting means with the threshold stored in the threshold storing means, and updates the depth value when the counted value exceeds the threshold. In this embodiment, a depth value is updated based on a comparison of a count determined by the counting means with the threshold. In a case that a count determined by the counting means exceeds the threshold, it is possible to limit a range of depth values while maintaining expression of an object depicted in a 3D image natural.

In yet another preferred embodiment, the apparatus further comprises an obtaining means for obtaining an initial value input by an input device, wherein the changing means sets the initial value obtained by the obtaining means as a depth value of a pixel which is first selected by the selecting means from the pixels lying in the prescribed direction. In this embodiment, it is possible to adjust depth values of pixels included in an original image collectively. As a result, a generated stereoscopic image has a wide variety of characteristics according to an input by the input device In yet another embodiment, the apparatus further includes grayscale storing means for storing a grayscale for each of the pixels included in the original image, wherein the stereograph means includes: generating means for generating an image for a left eye in which each grayscale of target pixels in the original image is identical to a grayscale of a respective pixel in the generated image, the respective pixel lying in a same line of the target pixel, a target pixel and the respective pixel are apart by a distance corresponding to a depth value of the target pixel in a direction, and for generating an image for a right eye in which each grayscale of target pixels in the original image is identical to a grayscale of a respective pixel in the generated image, the respective pixel lying in a same line of the target pixel, a distance between a target pixel and the respective pixel corresponding to a depth value of the target pixel in a further direction; and synthesizing means for synthesizing the images for left and right eyes generated by the generating means to generate a stereoscopic image.

A problem is known that a pixel defect easily occurs when a technique of shifting the pixel in an original image according to its depth value is adapted. In this embodiment, however, any pixel of images for the left and right eyes is necessarily selected from a pixel of the original image, the distance corresponding to the depth value. As a result, it is possible to prevent the pixel defect from occurring.

It is not necessary to employ grayscales of pixels included in the original image to generate the images for left and right eyes. For example, it is possible to employ a pixel value instead. Specifically, in yet another preferred embodiment, the stereograph means includes: generating means for generating an image for left eyes in which each grayscale of target pixels in the original image is identical to a grayscale of a respective pixel in the generated image, the respective pixel lying in a same line of the target pixel, a distance between a target pixel and the respective pixel corresponding to a depth value of the target pixel in a certain direction, and for generating an image for a right eye in which each grayscale of target pixels in the original image is identical to a grayscale of a respective pixel in the generated image, the respective pixel lying in a same line of the target pixel, a distance between a target pixel and the respective pixel corresponding to a depth value of the target pixel in a further direction; and synthesizing means for synthesizing the images for left and right eyes generated by the generating means to generate a stereoscopic image.

In these preferred embodiments, the generating means iterates the generation of the images for left and right eyes, wherein in each of the generation processes except for a first generation process, images for left and right eyes which have been generated in an immediately preceding generation process are used as a basis for generating images for left and right eyes; and the synthesizing means synthesizes images for left and right eyes generated through multiple generation processes, to generate the stereoscopic image. In these embodiments, the generation of a pair of images for left and right eyes are performed in multiple stages. Thus, it is possible to obtain a stereoscopic image appearing less pixel defects in comparison with a case where a single synchronizing process is performed.

In yet another preferred embodiment with respect to the stereograph means, there is provided an apparatus comprising: grayscale storing means for storing a grayscale for each of the pixels included in an original image; calculating means for calculating a depth value for each of the pixels; and stereograph means for generating a stereoscopic image based on depth values calculated by the calculating means, wherein the stereograph means includes generating means for generating an image for left eyes in which each grayscale of target pixels in the original image is identical to a grayscale of a respective pixel in the generated image, the respective pixel lying in a same line of the target pixel, a distance between a target pixel and the respective pixel corresponding to a depth value of the target pixel in a direction, and for generating an image for right eyes in which each grayscale of target pixels in the original image is identical to a grayscale of a respective pixel in the generated image, the respective pixel lying in a same line of the target pixel, a distance between a target pixel and the respective pixel corresponding to a depth value of the target pixel in a further direction; and synthesizing means for synthesizing the images for left and right eyes generated by the generating means to generate a stereoscopic image. In this embodiment, it is possible to adapt other methods of calculating depth values. For example, a depth value of a pixel is calculated based on a comparison of pixel values of the pixel and a neighboring pixel(s). Other known techniques of determining a depth value can also be employed in the present invention.

Functions of a stereoscopic image generation apparatus according to the present invention may be implemented to hardware designated for image processing (digital signal processor, DSP). However, it is possible to perform the functions by a computer (personal computer) and a program to cause the computer to execute instructions. Specifically, the program causes a computer device having a memory, in which pixel values of pixels included in an original image are stored, to execute the processes of: determining a depth value for each of the pixels included in the original image based on a comparison of pixel values of a pixel and at least one pixel adjacent to the pixel in a horizontal direction; and generating a stereoscopic image based on values of the pixels determined by the determining process. It is notable that the program achieves effects the same as those achieved by the stereoscopic generation apparatus of the present invention. The program of the present invention may be stored in a storing medium such as CD-ROM and provided to a user for installation on a computer. It is possible to provide a server apparatus to transmit the program to a user's computer to which the program should be installed, via a network.

The present invention can be adapted to a display for displaying images and a reproducing device for reproducing images stored in a storing medium. Specifically, the display includes: pixel value storing means for storing a pixel value for each of pixels included in the original image; determining means for determining a depth value for each of the pixels included in the original image based on a comparison of pixel values between a pixel and at least one neighboring pixel; and stereograph means for generating a stereoscopic image based on the pixel values of the pixels determined by the determining means.

The reproducing device includes a reading means for reading an original image from a storing medium such as an optical disk; determining means for determining, based on a comparison of pixel values between a pixel and at least one neighboring pixel, a depth value for each of the pixels included in the original image read from the storing medium; and stereograph means for generating a stereoscopic image based on the pixel values of the pixels determined by the determining means.

DESCRIPTION OF REFERENCE NUMERALS

D: Stereoscopic image generation apparatus
10: CPU
21: RAM
23: RAM
30: Storage unit
40: Display
45: Input device
IMG0: original image
Pix: pixel
Ps: subpixel Dg: original image data
D: pixel data
U (Ur, Ug, U): data element
G: pixel value
Gsub: subpixel value

BEST MODE FOR CARRYING OUT THE INVENTION

A. First Embodiment

A-1. Configuration of Stereoscopic Image Generation Apparatus

Figure 1:
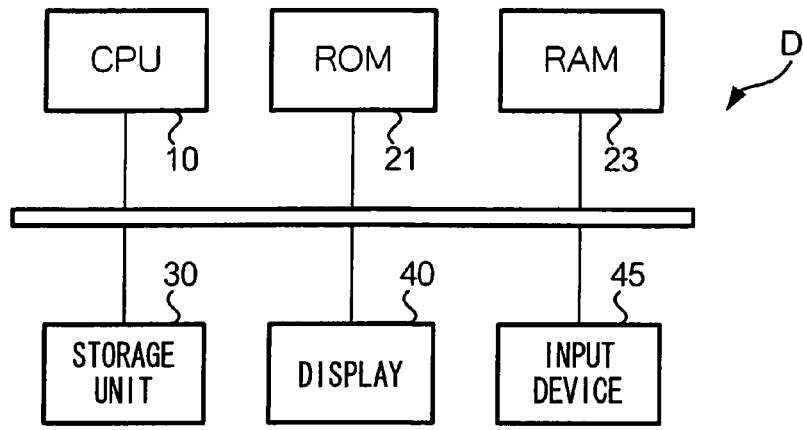
FIG. 1 is a block diagram showing a configuration of a stereoscopic image generation apparatus according to a first embodiment of the present invention.

FIG. 1 is a block diagram showing a configuration of a stereoscopic image generation apparatus D according the first embodiment. A CPU 10 shown in the figure performs as means for controlling each of units of stereoscopic image generation apparatus D. Specifically, it executes programs to perform calculations and control each of the units. A ROM 21 is a memory in which programs executable by CPU 10 are stored. A RAM 23 is a memory used by CPU 10 as a work area.

A storage unit 30 is a means for storing programs to be executed by CPU 10 and related data read when the programs are executed. For example, storage unit 30 is a hard disk drive integrating a magnetic disk, or a disk drive integrating storage media such as CD-ROMs. In addition, storage unit 30 stores an OS (operating system) for controlling entire operations of stereoscopic image generation apparatus D and an application program for performing image processing (hereinafter referred to as a image processing program). The image processing program causes CPU 10 to perform processing (hereinafter referred also to as stereograph processing) of generating image data representing a stereoscopic image based on data of an image representing a subject matter of an original image. The stereoscopic image is generated by synthesizing of images which are to be viewed by the left and right eyes of the user, respectively. The images for left and right eyes (hereinafter referred to as L-image and R-image) have parallax with each other.

A stereoscopic image which CPU 10 generates by executing the image processing program is displayed in a display 40. Display 40 is a means for displaying images under control of CPU 10. Display 40 includes elements such as a cathode ray tube (CRT) or liquid crystal panel. In this embodiment, display 40 displays images in a way that L-image and R-image reach the left and right eyes of the viewer, respectively. Specifically, several proposed techniques using polarized glasses worn by a user, and mechanisms for partially obstructing a user's view with lenticular lenses or parallax barriers can be employed to cause L-image and R-image to reach a viewers eye properly. It is notable that when glasses ('complementary color glasses') are worn by a viewer, each glass allowing particular frequency bands (ex. blue and red) to transmit, it is possible to omit a mechanism for causing images to reach a specific eye in display 40.

In this way, a viewer is caused to look an L-image and R-image using his/her left and right eyes, respectively. As a result, the viewer perceives a sense of depth for objects depicted in the original image.

Figure 2:
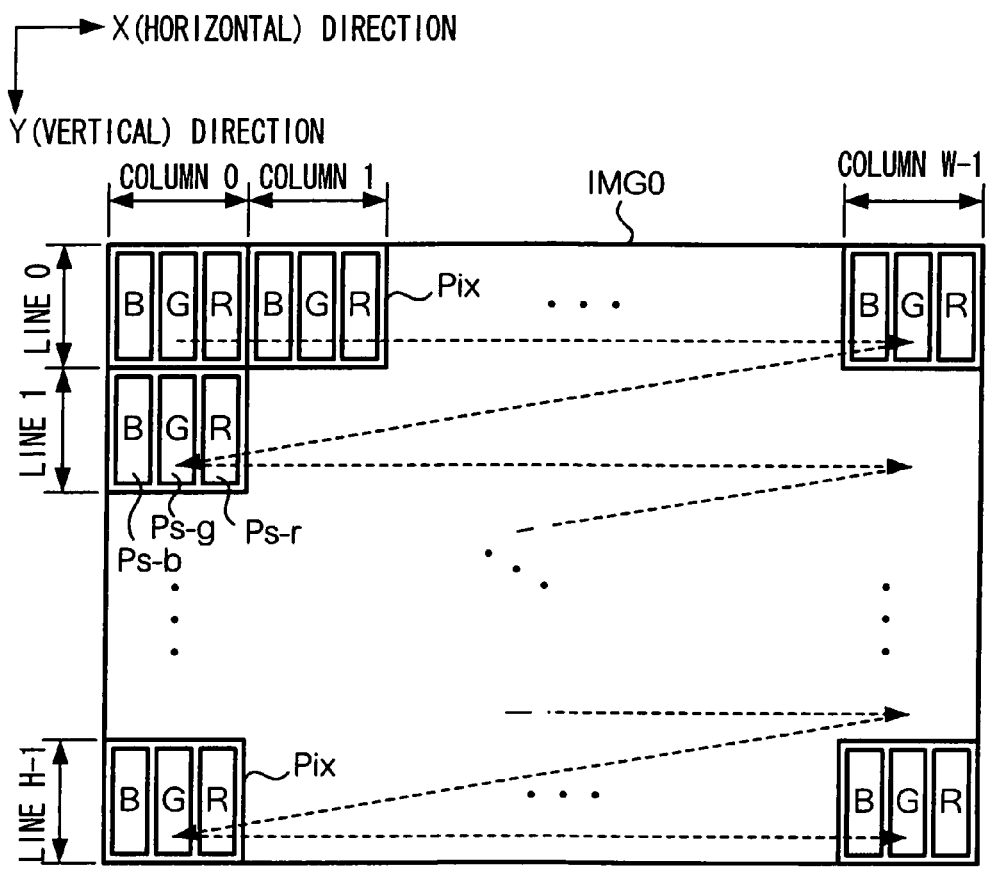
FIG. 2 illustrates a configuration an original image.

FIG. 2 shows a configuration of an original image IMG0. As shown therein, the original image IMG0 is included in pixels (Pixs) arranged in a matrix having H lines in X direction) and W columns in Y direction, where H and W are natural numbers. A pixel Pix is further included in three subpixels Ps having different colors (Ps-r, Ps-g, Ps-b). In this embodiment the subpixels Ps-r, Ps-g, Ps-b of each pixel are arranged in order from left to right (from minus to plus in X direction).

Figure 3:
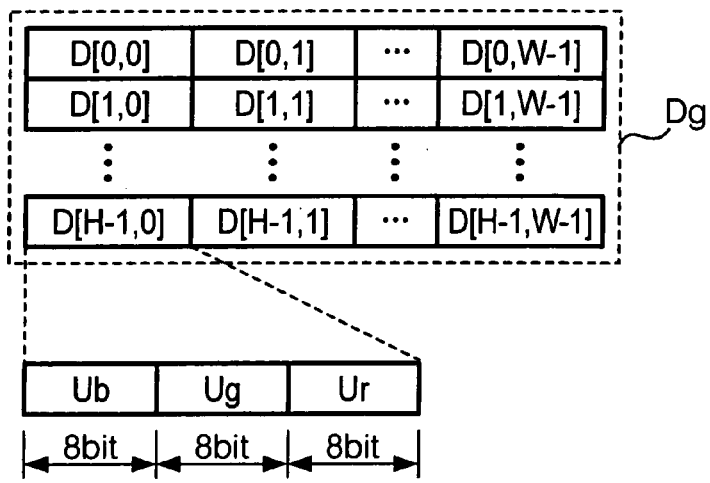
FIG. 3 illustrates a data structure of the original image.

Original image data representing the image IMG0 is stored in storage unit 30. As shown in FIG. 3, original image data Dg is a set of H*W items of image data D, each item defining a grayscale of a single pixel Pix. It is noted that in the figure a suffix '[i, j]' added to each data item D represents that the pixel Pix is located in ith line and jth column, where, i and j are integers, and 0<=i<=H−1, and 0<=j<=W−1. As shown in FIG. 3, a data item D includes three data elements (Ur, Ug, and Ub) corresponding to colors of the subpixels Ps. In other words, data elements Ub, Ug, and Ur represent grayscales of the subpixels Ps-b, Ps-g, and Ps-r, respectively. Each data element U has a length of 8 bits and thus the data item D comprises 24 bits. Accordingly, each data element U can take a value from 0 to 255 in a 256-step gradation. However, it is possible to change the lengths and the number of steps of each data element U. For example, each data item D, which is 16 bit data, is included in data elements Ub and Ur each having a length of 5 bits and data element Ug having a length of 6 bits.

Figure 4:
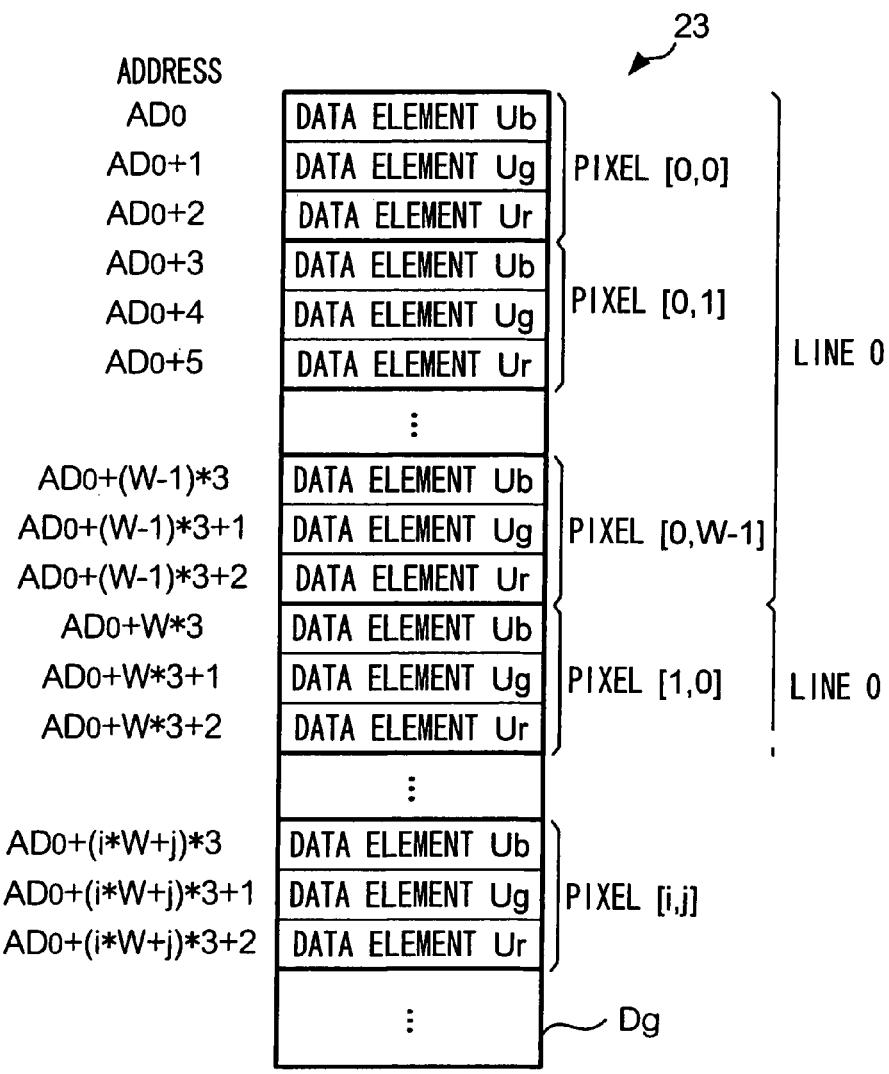
FIG. 4 illustrates a memory map of a RAM to which the original image data is transferred.

Original image data Dg stored in storage unit 30 is transferred to RAM 23 when the image processing program is executed. FIG. 4 shows a memory map of RAM 23 when original image Dg has been transferred to RAM 23. As shown in FIG. 4, original image data Dg is stored in a continuous area, starting at an Address AD0. Specifically, each data item D is stored in RAM 23 sequentially in accordance with the arrangement of pixels Pix included in original image IMG0. Date elements Us of a data item D are stored in different addresses in accordance with the arrangement of subpixels Ps. For example, data element Ub with respect to a blue subpixel PS-b of a pixel Pix located in 0th line and 0th column is stored in Address AD0. Data element item Ug with respect to a green subpixel PS-g of the pixel Pix is stored in an Address AD0+1. Data element Ur with respect to a red subpixel PS-r of the pixel Pix is stored in an Address AD0+2. In a general representation with line number i and column number j, data elements Ub, Ug, and Ur corresponding to blue, green, and red subpixels PS-b, PS-g, and PS-r in a pixel Pix located in 0th line and 0th column are stored in Addresses AD0+(i*W+j)*3, AD0+(i*W+j)*3+1, AD0+(i*W+j)*3+2, respectively.

An input device 45 shown in FIG. 1 includes a controller for inputting characters and symbols to supply signals according to an operation by a user to CPU 10. It is possible for the user to change variables used for the stereograph processing by inputting instructions via input device 45.

A-2. Outline of the Stereograph Processing

An outline of the stereograph processing performed by CPU 10 will now be described. The stereograph processing can be divided mainly into processing of calculating a pixel value G for each pixel Pix (hereinafter referred to as 'a pixel value calculation processing'), processing for determining a depth value Z for each pixel Pix based on the calculated pixel value G (hereinafter referred to as 'a depth calculation processing'), and processing for generating a stereoscopic image comprising pixels each having a parallax corresponding to its respective depth value (hereinafter referred to as 'a synthesizing processing'. The above processes are performed for each of the pixels Pix included in original image IMG0. Specifically, CPU 10 sequentially selects lines in an order from lines 0 to H−1. During a selection of a line, it sequentially selects pixels in the selected line in an order from lines 0 to W−1. A method of selecting pixels (Pix) is shown in FIG. 2. CPU 10 performs the series of processing described above for each selected pixels (Pix). Hereinafter, a selected pixel is referred also to as 'a target pixel'.

Figures 5, 6, 7:
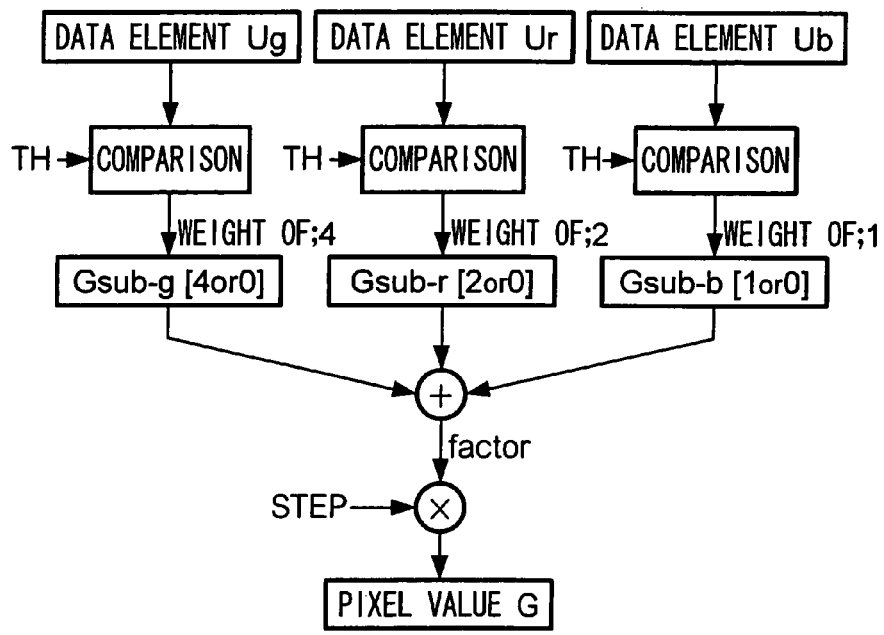
FIG. 5 illustrates a flow of calculating a pixel value.
FIG. 6 is a table defining correspondences of pixel values of pixels and respective pixel values of subpixels.
FIG. 7 is a table defining correspondences of pixel values of pixels and respective bits of subpixels.

(1) Pixel Value Calculation Processing (FIG. 5)

In the pixel value calculation processing a pixel value G for each pixel Pix is calculated based on data elements U included in the respective pixel data D. Specifically, CPU 10 transforms grayscales represented by data elements Us of subpixels included in a target pixel P into binary data items, and assigns the binarized data items, so as to generate values Gsub (hereinafter referred to as 'subpixel values'). More specifically, CPU 10 compares a grayscale of green subpixel Ps-g represented by data element Ug with a threshold TH stored in RAM 23, as shown in FIG. 5. If the grayscale is larger than threshold TH, 4 is assigned for the subpixel value Gsub-g of the green subpixel. If the grayscale is smaller than the threshold TH, 0 is assigned for Gsub-g. Next, if a grayscale of the data element Ur is larger than the threshold TH, CPU assigns 2 for the subpixel value Gsub-r of the red subpixel. If the grayscale is smaller than the threshold TH, 0 is assigned for the subpixel value Gsub-r of the red subpixel. Similarly, if a grayscale of the data element Ub is larger than the threshold TH, CPU assigns 1 for the subpixel value Gsub-b of the blue subpixel. If the grayscale is smaller than the threshold TH, 0 is assigned for the subpixel value Gsub-b of the blue subpixel (see FIG. 6). Referring back to FIG. 5, CPU 10 adds the subpixel values Gsub-g, Gsub-r, and Gsub-b and multiplies the added values (hereinafter also referred to as 'FACTOR') with a step value STEP, to determine a pixel value G of a target pixel P. It is possible for the user to change step value STEP via input device 45. As shown in FIG. 6, in a case that step value STEP is set 8, pixel value G determined through the foregoing processes can take any one of values 0, 8, 16, 24, 32, 40, 48, and 56. It is possible for a user to change a value of threshold TH via input device 45.

The pixel value calculation processing can be construed in another aspect. First, CPU 10 determines 0 or 1 for each subpixel value Gsub by comparing each of data elements U with threshold TH. Specifically, if data element Ub of a blue subpixel is larger than threshold TH, 0 is assigned for a subpixel value of Gsub-b for the blue subpixel (see FIG. 7). Next, CPU 10 generates a bit stream (FACTOR) which includes subpixel values Gsub-g, Gsub-b, Gsub-r of the green, red, and blue subpixels, the subpixel values being aligned in this order of from most significant bit to least significant bit, and CPU 10 multiplies the generated bit stream with step value STEP. Values included in the generated bit stream are the same as those obtained using a weight 4 ($=2^2$) for the subpixel value Sub-g located in the most significant bit, a weight 2 ($=2^1$) for the subpixel value Sub-r located in the next lower bit, and a weight 1 ($=2^0$) for the subpixel value Sub-b located in the leased significant bit. It is noted that possible pixel values G calculated using the bit stream multiplied with step value STEP are the same as those calculated by the method described with reference to FIG. 5.

In the embodiment, the weight for green subpixels is set at the largest value whereas the weight for red subpixels is set at the smallest value. The reason will now be provided. It is known that the ratio of cones sensitive to green, red, and blue light in the retina of a human eye is generally 59% for green, 30% for red, and 11% for blue. Accordingly, a human is more sensitive to green than to red and blue. In view of this, in the embodiment, the weights for subpixel values for green, red, and blue subpixels are set in a manner that the subpixel value for green is the largest, the subpixel value for red is the smallest, and the subpixel value for blue is between those for red and green. In the weight configuration to calculate pixel values G, a generated stereoscopic image reflects characteristics of a human vision system, thereby enabling a viewer to perceive the image with a natural sense of depth.

Figures 8, 9:
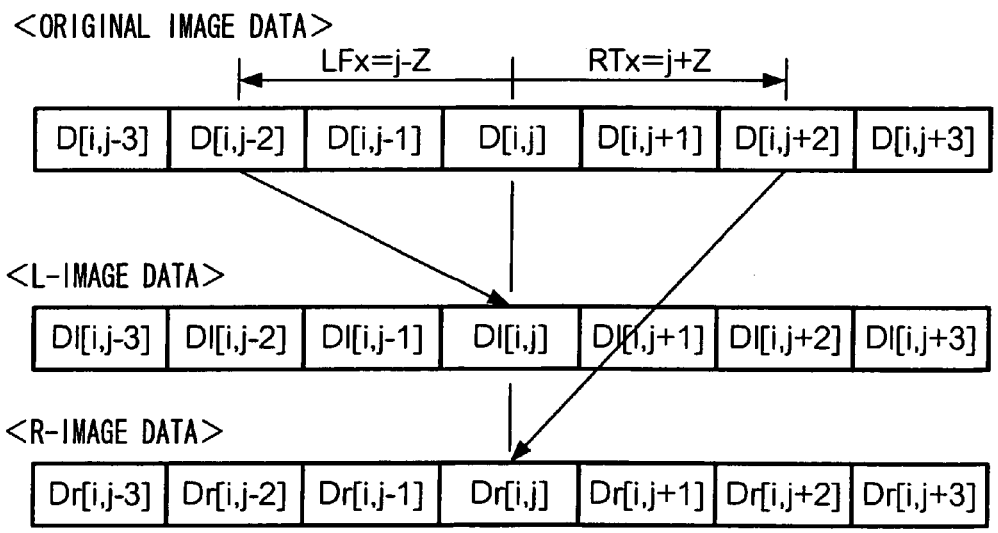
FIG. 8 illustrates a depth calculation processing.
FIG. 9 illustrates a synthesizing processing.

(2) Depth Calculation Processing (FIG. 8)

In the depth calculation processing, a depth value Z for each of pixels is calculated based on a pixel value G of the respective pixel, the depth value defining a degree of depth of an image located in the pixel perceived by a viewer. As described above, upon selection of a line (hereinafter referred to as a target line), CPU 10 sequentially selects a pixel Pix (a target pixel P) in the target line in an order of from columns 1 to W−1. Next, CPU 10 assigns a depth value Zx stored in RAM 23 for the target pixel P. Value Zx (variable) is updated in accordance with change of pixel values G that may appear after sequential selection of pixels in the target line. Details of this processing will be described below.

CPU 10 determines whether a pixel value G of a target pixel Pix of jth column in the target line increases or decreases with respect to a pixel value G of a pixel Pix of j−1th column. Next, if an increase of a pixel value G is detected, CPU 10 sets a flag RAISE_UP indicating that there is an increase in a pixel value G at a pixel (hereinafter referred to as 'a rising edge of G'), for a variable WHICH stored in RAM 23. If a decrease of a pixel value G is detected, CPU 10 sets a flag FALL_DOWN which indicates that there is a decrease in a pixel value G at a pixel (hereinafter referred to as 'a falling edge of G'), for variable WHICH. If there is no change in the pixel value G at the position, CPU 10 maintains a flag as set for the previously selected pixel. Simply put, variable WHICH is an indicator that indicates an increase/decrease of pixel values G at a target pixel in the target line.

FIG. 8 shows an example of pixel values G for pixels Pix located in columns 0 to 18 in the target line. As shown in the figure, when the depth calculation processing for a target line is initiated (i.e. when a pixel Pix in column 0 is selected as a target pixel P), a flag of variable WHICH is set to RAISE_UP as an initial condition. In FIG. 8, appearances of the rising and falling edges of G are indicated by an upward pointing arrow and downward pointing arrow, respectively. A sign '-' is used to represent a case where there is no change in the pixel value G. In the figure, a pixel value G (32) of a pixel Pix in the column 7 is decreased (small) with respect to a pixel value G (48) of a pixel Pix of the immediately preceding selection (i.e. a pixel Pix located in column 6). Accordingly, a flag of variable WHICH is updated from RAISE_UP to FALL_DOWN when selecting the pixel Pix in the column 7 as a target pixel P. As for pixels in columns 8 and 9, since a pixel value G decreases with respect to a pixel value of a pixel in the immediately preceding column, a flag of variable WHICH is maintained in FALL_DOWN when selecting the pixel as a target pixel P. A pixel value G (16) of a pixel in column 10 increases with respect to the pixel value G (8) of a pixel in column 9, when selecting the pixel in column 10 as a target pixel P, thus a flag of variable WHICH is changed from FALL_DOWN to RAISE_UP. Explanation of flags of variable WHICH when selecting other pixels is omitted.

Upon detection of a change of a flag of variable WHICH (including a change from RAISE_UP to FALL_DOWN or from FALL_DOWN to RAISE_UP), CPU 10 increases or decreases variable Zx by a step value PLX, accordingly. Specifically, as shown in FIG. 8, in a case where variable WHICH is changed from RAISE_UP to FALL_DOWN, variable Zx is increased. For example, as shown in FIG. 8, when the pixel in column 7 is selected, variable WHICH is changed from RAISE_UP to FALL_DOWN, thus CPU 10 decreases the variable Zx by step value PLX at the time. When the pixel in column 10 is selected, variable WHICH is changed from FALL_DOWN to RAISE_UP, thus CPU 10 increases variable Zx by step value PLX at the time. In other words, the step value PLX defines a variation range of variable Zx (and accordingly a depth length Z). Step value PLX can be changed by input device 45.

Next, when detecting rising edges of G for certain times exceeding threshold N in succession, CPU 10 increments variable Zx stored in RAM 23 by step value PLX. In the following description, N should be 4. For example, as is apparent from FIG. 8, pixel value G of the pixels in columns 1 to 4 are 16, 24, 32, and 40, respectively, this means that pixel value G increases four times in succession. The pixel value G of the pixel in column 5 is 48, this means that there is an increase of G with respect to the pixel value of the pixel of immediate preceding selection (pixel in column 4). At the time when the pixel in column 5 is selected as a target pixel P, the counted number of successive increases of G becomes 5, exceeding the threshold set to 4. Accordingly, CPU 10 adds step value PLx to the previous value Z0 to update variable Zx to a value z0+PLX. The updated variable Zx is assigned to a depth value Z of the pixel Pix in column 5. Successive increases appear at the pixels in columns 10 to 12. However, the number of successive increases is 3, which is smaller that the threshold 4. Thus, CPU 10 does not update variable Zx in this case.

Similarly, when detecting falling edges of G for certain times exceeding the threshold N in succession, CPU 10 decrements variable Zx stored in RAM 23 by step value PLX. For example, as is apparent from FIG. 8, pixel values G of the pixels in columns 13 to 17 are 32, 24, 16, 8, and 0, respectively, decreasing five times in succession. Thus, at the time when the pixel in column 17 is selected as a target pixel P (i.e. the counted number of successive increases of G reaches 5), CPU 10 subtracts step value PLX from the previous value Z0, so as to update variable Zx to z0-PLX. The updated variable Zx is assigned to a depth value Z of the pixel Pix in column 17. Successive increases appear in the pixels in columns 7 to 9. However, the number of the successive increases is 3, which is smaller than the threshold 4. Thus, CPU 10 does not update the variable Zx when selecting those pixels Pix. As described above, in the embodiment, a variable ZX assigned to each of the pixels as a depth value X of the pixel is updated based on a variation of pixel values G with respect to respective neighboring pixels. Specifically, the updating may be performed based on the number of successive increases or decreases of the pixel values G. The depth calculation processing described above is performed for each of the lines, to determine depth values Zs for all pixels of the original image. It is possible to change a value of threshold N by operating input device 45. Also, it is possible to set a first value of a threshold for the number of successive increases and a second value of a threshold for the number of successive decreases, where the first and second values are different.

(3) Synthesizing Processing (FIG. 9)

In the synthesizing processing, images for left and right eyes (L-image and R-image) are generated, in which images pixel (Pix) has parallax corresponding to a respective depth value, and thus the generated L- and R-image are synthesized, so as to generate a stereoscopic image. When the pixel located in ith line and jth column is selected as a target pixel, CPU 10 calculates a value LFx (i.e. j−z) by subtracting a depth value Z of the target pixel P from the column number (i.e. j) of the target pixel P. Next, CPU 10 assigns pixel data D of a pixel Pix located in the ith line and LFxth column in original image IMG0 to pixel data Dl of a pixel located in the ith line and jth column included in L-image. Similarly, CPU 10 calculates a value LFx (i.e. j+z) by adding a depth value Z of the target pixel P to the column number (i.e. j) of the target pixel P. Next, CPU 10 assigns pixel data D of a pixel Pix located in the ith line and Rtxth column in the original image IMG0 to pixel data Dr of a pixel located in the ith line and jth column included in the image for right eye.

For example, where a depth value Z of a target pixel P located in the ith line and jth column is 2, j−2 is substituted for the variable LFx. As a result, as shown in FIG. 9, pixel data D[i,j−2] of the pixel located in ith line and j−2th column in the original image IMG0 is assigned to pixel data Dl[i,j] of the pixel located in ith line and jth column of L-image. Whereas j+2 is substituted for the variable RTx, thus pixel data D[i,j+2] of the pixel located in ith line and j+2th column in original image IMG0 is assigned to pixel data Dr[i,j] of the pixel located in ith line and jth column of R-image. This processing is performed for all pixels Pix in a selected line. When this process is applied for every line, a set of image data of L-image and R-image is generated. The generated image data is stored in RAM 23 in a same manner shown in FIG. 4.

It is notable that other methods of generating L- and R-images based on pixel values of pixels Pix in original image IMG0 can be adapted. For example, it is possible to shift each pixel Pix of original image IMG0 according to its pixel value Z to generate L- and R-images. In this case, however, when there are neighboring pixels having extremely different pixel values Z in original image IMG0, a pixel vacancy area in L- or R-image will possibly appear in an area as a result of shifting the pixel such a large distance. Even if this case, the vacant area is compensated using techniques to, for example, shade off the area. However, the additional processing increases the amount of calculation performed by a processor. In the present invention, any pixel in L- and R-image is necessarily selected in data D of a pixel of original image IMG0. Thus, a problem of appearance of a vacant area is avoided. As a result, it is possible to generate L- and R-images by a small amount of computation.

When a set of images for left and right eyes is generated, CPU 10 synthesizes the images to generate a stereoscopic image. For example, in a case where the stereoscopic image is to be viewed with a mechanism employing display 40 and polarized glasses for a user on which polarizing films having different polarization characteristics are provided, pixels located in odd lines of L-image and even lines of R-image are selected and thus synthesized to form a stereoscopic image. It is noted that other mechanisms for providing a user with a stereoscopic image can be adapted. Simply put, it is possible to adapt a method for synthesizing L- and R-images in accordance with an adapted mechanism.

A-3. Details of the Stereograph Processing

When a user inputs an instruction of executing the image processing program via Input device 45, CPU 10 reads the program from RAM 23 and executes it. Detailed processes performed by the program will now be described referring to FIGS. 10 to 13. Steps from Sc1 to Sb8, from Sc1 to Sc14, and from Sd1 to Sd7 correspond to the pixel value calculation processing, depth calculation processing, and synthesizing processing, respectively.

Figure 10:
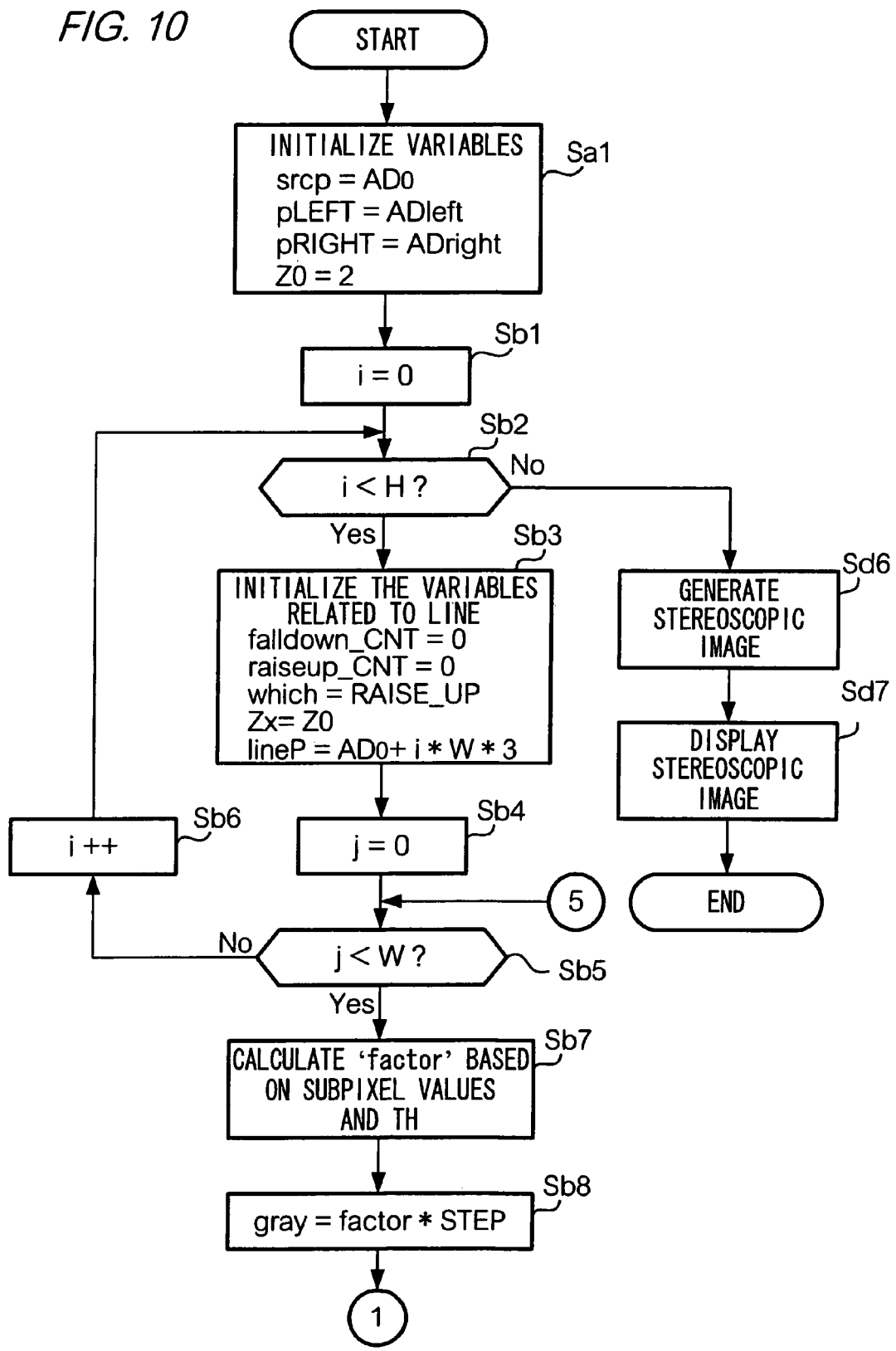
FIG. 10 is a flowchart showing a sequence of generating a stereoscopic image.

As shown in FIG. 10, when the image processing program is executed, CPU 10 first initializes variables srcp, pLEFT, pRIGHT, and Z0 in step Sa1. The variable srcp represents a head address of an area for storing pixel data D of a target pixel P (more precisely, data element Ub of a blue subpixel Ps-b of the target pixel) selected from pixels included in the original image IMG0. As stated, in the embodiment target pixels are selected sequentially starting from a pixel in 0th line and 0th column. Therefore, in step Sa1, CPU 10 substitutes a head address AD0 of an area of RAM 23 where the original image data Dg is stored (i.e. an address in which data element Ub of a blue subpixel Ps-b of the pixel in 0th line and $0^{th}$ column is stored) in the variable srcp for initialization. The variables pLEFT and pRIGHT represent a header address of an area for storing pixel data Dl and Dr of a target pixel P of L- and R-images, respectively. In step Sa1 CPU 10 substitutes ADleft (a head address of an area for storing pixel data of L-image) into the variable pLEFT and substitutes ADright (a head address of an area for storing pixel data of R-image) into the variable pRIGHT. The variable Z0 represents an initial value of a depth value used in the depth calculation processing. In the following description, an initial value of Z0 is set to 2 by CPU 10. A user may change the initial value by operating Input device 45.

Next, CPU 10 initializes a variable i that represents a line of the original image IMG0 to 0 in step Sb1 and determines whether variable i is smaller than the total number H of the lines in step Sb2. If variable i is smaller than H, this means that processing is not performed for all lines, and CPU 10 initializes variables relating to a selected line in step Sb3. Specifically, in step Sb3, variables falldown_CNT and raiseup_CNT are set to 0. The variables falldown_CNT and raiseup_CNT represent the numbers of the successive increase and decrease, respectively. A flag of variable WHICH is set to RAISE_UP for initialization, as described with reference to FIG. 8. Variable Zx representing a depth value Z of each pixel Pix is set to initial value Z0. AD0+I*W*3 is substituted into the variable lineP. The value of AD0+I*W*3 represents an address of an area in which pixel data of a pixel Pix of original image IMG0 is stored, the pixel being located in 0th column in a selected line (See FIG. 4).

Next, CPU 10 initializes a variable j representing a selected column of original image IMG0 to 0 in step Sb4, and determines whether variable j is smaller than the total number W of the columns in step Sb5. If variable j is larger than W, this means that the processing is not performed for all pixels in a selected column, and CPU 10 increments variable j by 1 in step Sb6. After that, the process goes back to step Sb2. The increment of step Sb6 means changing a line to the next one for selection.

If variable j is smaller than W (i.e. processing is not performed for all pixels Pix in a selected line) in step Sb5, CPU 10 substitutes a value, which is calculated from data element U of subpixels of a target pixel using a method shown in FIG. 5, into a variable FACTOR in step Sb7. Specifically, FACTOR is calculated based on data element Ub of a blue subpixel stored in an address specified by variable srcp, data element Ug of a green subpixel stored in an address srcp+1, and data element Ur of a red subpixel stored in an address srcp+2. Next, CPU 10 multiplies the calculated value of FACTOR with step value STEP to obtain a pixel value G. The value G is substituted into a variable GRAY in step Sb8. In the above steps thus far, calculation of a pixel G of a target value P is completed.

Figure 11:
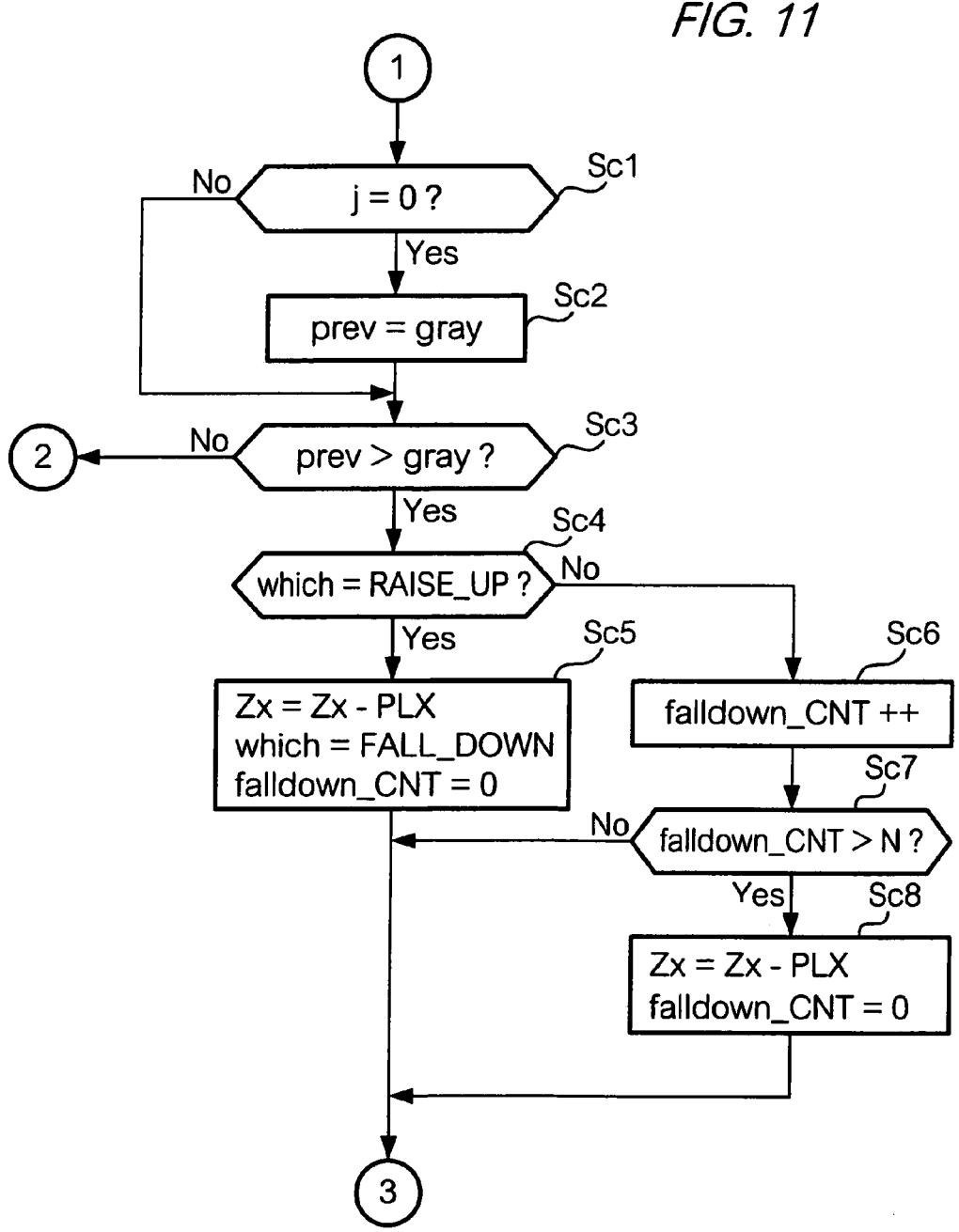
FIG. 11 is also a flowchart showing a sequence of generating a stereoscopic image.

Next, as shown in FIG. 11, CPU 10 determines whether variable j is 0 or not, i.e. whether the target pixel P is a pixel Pix located in the first (0th) column of the selected line in step Sc1. When variable j is 0, CPU 10 substitutes a pixel value G currently assigned to variable GRAY into variable PREV. Variable PREV is a value that indicates a pixel value of the pixel Pix located immediate to the left of target pixel P. It is noted that since there is no pixel to the left of the pixel located in the first column of each of the selected lines, when the pixels of the first column are selected (i.e. variable j is 0), a pixel value G of the target pixel is substituted into variable PREV in step Sc2.

In steps Sc3 to Sc8, whether a pixel value G decreases is detected and variable Zx is updated based on a detection result. Specifically, CPU 10 determines whether the variable PREV is larger than the variable GRAY in step Sc3. As described above, a pixel value G of the target pixel P is assigned to the variable GRAY. Accordingly, whether a pixel value of the target pixel P decreases with respect to the pixel located immediate left to the target pixel P is determined in step Sc3. It is noted that when the target pixel P is a pixel Pix located in the first column of a selected line, the variable PREV and GRAY are same. In this case, a result of step Sc3 becomes negative.

When it is determined in step Sc3 that the variable PREV is larger than the variable GRAY (i.e. a pixel value G of the target pixel P decreases with respect to the pixel immediate to the left of the target pixel), CPU 10 determines, in step Sc4, whether variable WHICH has been set to RAISE_UP. When RAISE_UP is set for variable WHICH (i.e. the tendency of pixel values G turns at the target pixel P from increasing to decreasing), CPU10 decreases the variable Zx by a step value PLX in step Sc5. Next, CPU 10 sets a flag FALL_DOWN representing the decreasing tendency of pixel values Gs for variable WHICH, FALL_DOWN representing a decreasing tendency of pixel values G, and CPU 10 sets 0 for a variable falldown_CNT representing the number of successive decrease of pixel values G in step Sc5.

In a case where RAISE_UP is not set for the variable WHICH (i.e. FALL_DOWN is set for the variable WHICH for the reason that a decrease of a pixel value G has been detected at a previously selected target pixel P), CPU10 increments the variable falldown_CNT indicative of the number of successive decrees by 1 in step Sc6. Next, CPU 10 determines whether variable falldown_CNT is larger than threshold N in step Sc7. When it is determined that variable falldown_CNT is larger than threshold N (i.e. when the number of successive decreases becomes larger than N+1), CPU 10 subtracts step value PLX from variable Zx, and resets the variable falldown_CNT to 0 in step Sc8. Accordingly, in a case where the tendency of variable Zx turns decrease after more than N times successive decreases, variable Zx cannot decrease until the number of successive decreases counted from scratch reaches N again. In a case where variable falldown_CNT is equal to or lower than the threshold N, CPU 10 skips process of step Sc8.

Figure 12:
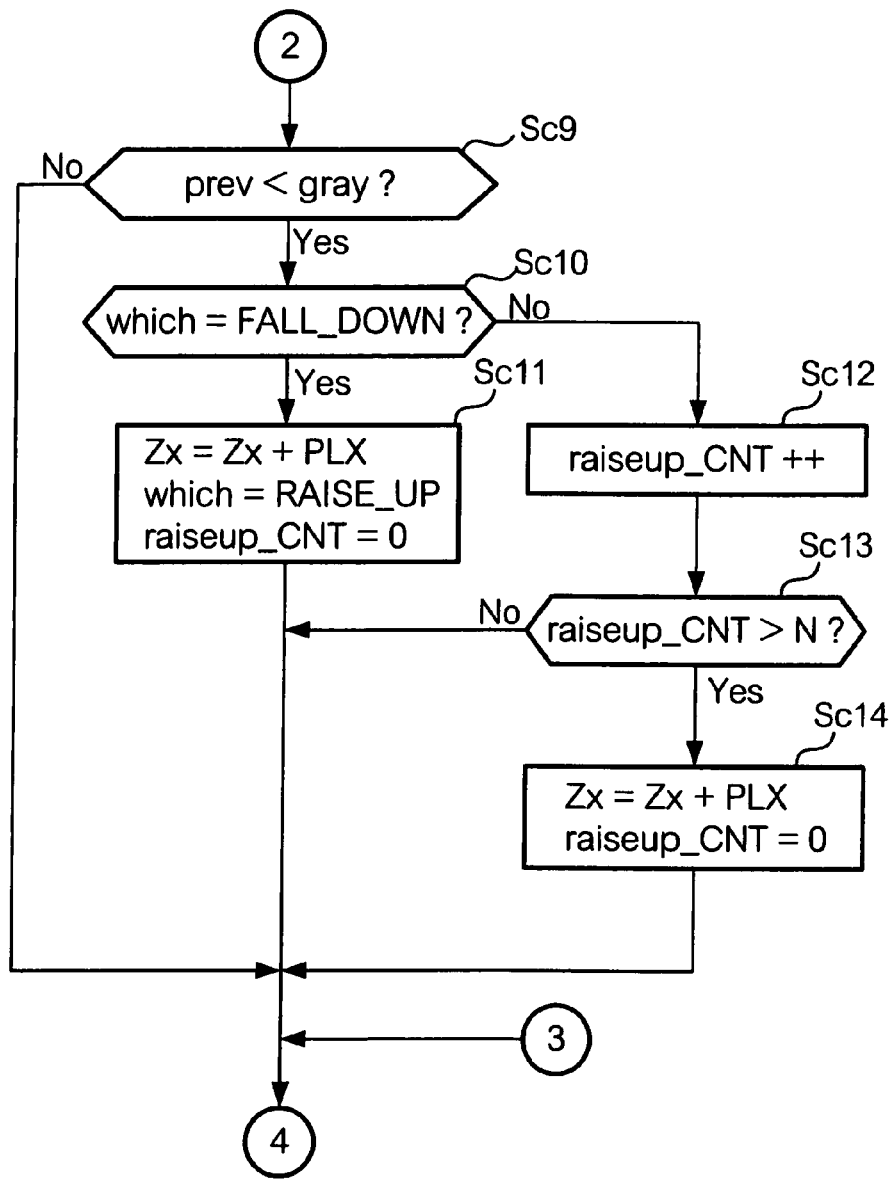
FIG. 12 is also a flowchart showing a sequence of generating a stereoscopic image.
Figure 13:
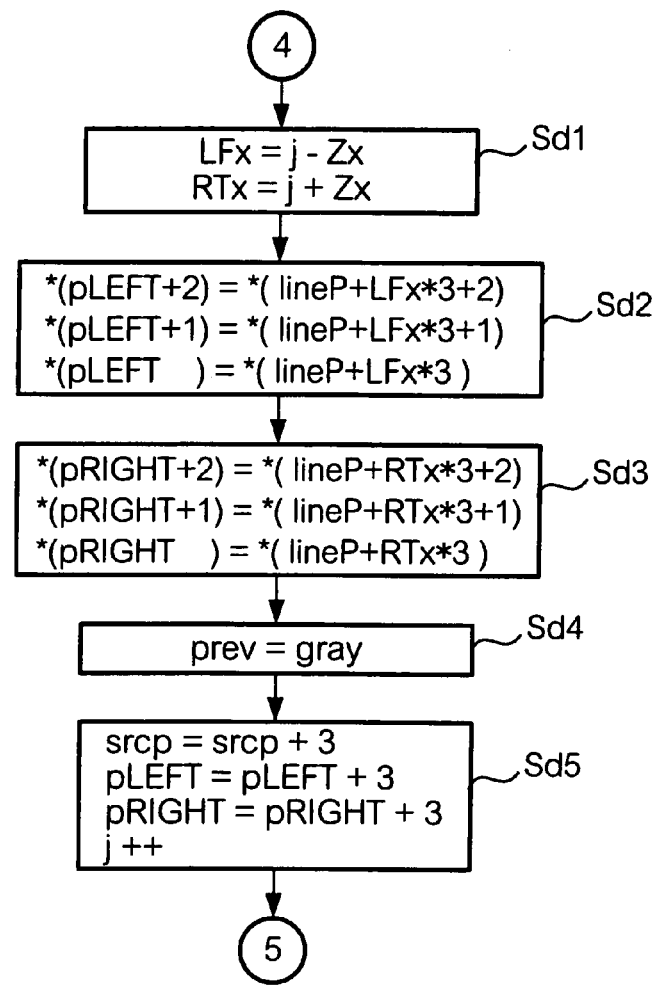
FIG. 13 is also a flowchart showing a sequence of generating a stereoscopic image.

In a case where the determination of step Sc3 is negative, a series of processes is performed to determine whether to appear an increase of pixel variables Gs and to update variable Zx based on a result of the determination in steps Sc9 to Sc14. Specifically, as shown in FIG. 12, CPU10 determines whether variable PREV is smaller than variable GRAY in step Sc9. In other words, it is determined in step Sc9 whether a pixel value G of a target pixel P increases with respect to a pixel located immediately to the left of the target pixel. It is noted that when the target pixel P is a pixel Pix located in the first column of a selected line, variable PREV and GRAY are same. In this case, a result of step Sc3 becomes negative.

When it is determined in step Sc9 that variable PREV is smaller than variable GRAY (i.e. a pixel value G of a target pixel P increases with respect to the pixel immediately to the left of the target pixel), CPU 10 determines whether variable WHICH is set to FALL_DOWN in step Sc10. When FALL_DOWN is set for variable WHICH (i.e. the tendency of pixel values G turns over at the target pixel P from decreasing to increasing), CPU10 adds step value PLX to variable Zx. Next, CPU 10 sets RAISE_UP representing the increasing tendency of pixel values Gs for the variable WHICH and it sets 0 for raiseup_CNT representing the number of successive increases in step Sc11.

In a case where FALL_DOWN is not set for variable WHICH (i.e. RAISE_UP is set for variable WHICH for the reason that an increase of a pixel value G has been detected at a previously selected target pixel P), CPU10 increments variable raiseup_CNT indicative of the number of successive increases by 1 in step Sc12. Next, CPU 10 determines whether variable raiseup_CNT is larger than threshold N in step Sc13. When it is determined that variable raiseup_CNT is larger than the threshold N (i.e. the number of successive increases becomes larger than N+1), CPU 10 adds the step value PLX to the variable Zx, and resets the variable raiseup_CNT to 0 in step Sc14. Accordingly, in a case where the tendency of variable Zx turns increase after more than N times successive increases, the variable Zx cannot increase until the number of successive increases counted from scratch reaches N again. In a case where variable raiseup_CNT is equal to or lower than threshold N, CPU10 skips the process of step Sc14.

When the depth calculation processing is finished through the foregoing steps (i.e. a case where the negative result is obtained in steps Sc3, SC7, Sc9, or Sc13, or a case where process of steps Sc5, Sc8, Sc11, or Sc 11 is finished), the synthesizing processing is initiated in steps Sd1 to sd7. Specifically, CPU10 assigns a value obtained by subtracting a current value of variable Zx from variable j to variable LFx, and assigns to the variable RTx a value obtained by adding variable j in step Sd1. As described with reference to FIG. 9, variables LFx and RTx indicate pixels Pix of original image IMG0 to be assigned to L- and R-images, respectively. In other words, the current value of variable Zx is set for a depth value Z of a target pixel P.

Next, CPU10 assigns an address for storing pixel data D of a pixel Pix of original image IMG0, the pixel specified by the variable LTx, to an address for storing pixel data Dl of a pixel Pix of L-image located in the ith line and jth column in step Sd2. More specifically, an address lineP+LFx*3 for storing the original image data Dg is written in an address pLEFT for storing data element Ub of a subpixel Ps-b of a pixel Pix of L-image, the pixel located in ith line and jth column. It is noted that since AD0+I*W*3 has been assigned to the variable lineP in step Sb2, an address AD0+i*W*3+LFx*3 or AD0+(i*W+LFx)*3 is written in address pLEFT. As shown in FIG. 4, address AD0+(i*W+LFx)*3 is an address for storing pixel data D of a pixel Pix located apart from a target pixel P in a horizontal direction by the number of pixels specified by variable LFx. Thus, address lineP+LFx*3 for storing data element Ub of a blue subpixel of a pixel included in original image IMG0 and located apart from a target pixel P in the horizontal direction by the number of pixels specified by variable LFx is written in an address pLEFT for storing data element Ub of subpixel Ps-b of a pixel of ith line and jth column of L-image. It is noted that data element Ug of the green subpixel is stored in an address specified by increasing the address of blue subpixel data Ub by 1. Thus, address lineP+LFx*3+1 for storing data element Ug of the green subpixel of a pixel included in original image IMG0 and located apart from a target pixel P in the horizontal direction by the number of pixels of LFx is written in address pLEFT+1 for storing data element Ug of subpixel Ps-g of a pixel of ith line and jth column of R-image. Similary, address lineP+LFx*3+2 is written in address pLEFt+2 for storing data element Ur of a subpixel Ps-r. In this processing, a set of pixel data Dl of L-image shown in FIG. 9 is generated.

In step Sd3, a processing similar to step Sd2 is performed for R-image based on variable RTx. Specifically, CPU 10 writes address lineP+RFx*3 for storing data element Ub of a blue subpixel of a pixel included in original image IMG0 and located apart from a target pixel P in the horizontal direction by the number of pixels specified by variable RFx in an address pRIGHT for storing data element Ub of subpixel Ps-b of a pixel of ith line and jth column of R-image. Similary, address lineP+RFx*3+1 of original image data Dg is written in the address pRIGHT+1 for a green subpixel Ps-g of R-image. Address lineP+RFx*3+2 of original image data Dr is written in the address pRIGHT+2 for a red subpixel Ps-r of R-image. In this processing, a set of pixel data Dr of R-image shown in FIG. 9 is generated.

Next, CPU 10 assigns a value of variable GRAY calculated in step Sb8 to variable PREV in step Sd4. This step is carried out in order to compare a pixel value G of a pixel to be next selected as a target pixel P (i.e. a pixel immediate right to the currently selected target pixel P) with a pixel value G of the currently selected target pixel P. CPU10 updates the related variables stored in RAM23 in step Sd5. Specifically, CPU10 increments variable srcp by 3. Accordingly, variable srcp becomes indicative of an address of a pixel data D of the next selected target pixel of the original image IMG0. Similary, CPU10 increments variables pLEFT and pRIGHT by 3. Accordingly, variables pLEFT and pRIGHT become indicative of head addresses of the areas in which of pixel data Dl and Dr of the next selected target pixel P are stored, respectively. Next, CPU10 increments variable j representative of a column number of a target pixel P, to select a pixel immediately to the right of currently selected target pixel P as a new target pixel P. After performing processing of step Sd5, CPU10 proceeds to step Sb5 of FIG. 10 to perform the same processing on the new target pixel P. When this processing has been performed on every pixel Pix of a selected line, a result of the determination of step Sb5 becomes negative and therefore variable i is incremented by 1 in step Sc6, to change a target line to another line.

When the foregoing processing is performed on every pixel Pix of all the lines, a result of the determination of step Sb2 turns negative. In this case, CPU10 synthesizes L- and R-images generated in steps Sd2 and Sd3 to generate a stereoscopic image in step Sd6, and displays the stereoscopic image in display 40 in step Sd7. A user perceives L- and R-images with left and right eyes, respectively. As a result, a sense of depth corresponding to depth values calculated for the pixel is provided to a viewer.

As described in the foregoing description, a depth value of a target pixel P is determined based on a comparison between pixel values G of a target pixel P and a pixel Pix adjacent to the target pixel in the horizontal direction in the embodiment. Thus, it is possible for a viewer to view a generated image with a natural sense. In the embodiment, a depth value Z is changed when a pixel value G of the pixels Pix successively increases or decreases with respect to adjacent pixels more than N successive times, where N is defined as a threshold. In other words, when there is an area in which a pixel value is changed with respect to adjacent pixels within the threshold N pixels, every pixel Pix in the area has the same depth value Z. When updating a depth value Z of a pixel Pix, step value PLx is employed to increase or decrease a current depth value Z according to a change of a pixel value G with respect to adjacent pixels. In the embodiment, a range of possible depth values Z of pixels is limited in a narrow range in comparison to a conventional technique in which a pixel value of a pixel is determined directly from a grayscale of the pixel. As a result, it is possible to avoid effecting to a viewer an impression that only a portion of the object in a generated stereoscopic image is unnaturally projected (or recessed) locally, and to avoid occurrence of distortion in the stereoscopic image due to an occurrence of the pixel-crossing phenomenon, effectively. It is notable that it is not necessary to prompt a user to input various parameters suitable for each original image IMG0 when generating a stereoscopic image An initial value of variable Zx is indicative of a depth value Z that characterizes a general sense of depth to a stereoscopic image. When initial value Z0 is set to a relatively large value, larger depth values Zs of original image IMG0 are calculated across the whole image. As a result, a viewer perceives objects in the stereoscopic image as being located further backward (frontward). Whereas when the initial value Z0 is set to a relatively small value, smaller depth values Z of original image IMG0 are calculated across the whole image. As a result, a viewer perceives objects depicted in the stereoscopic image as being located further frontward (backward). In view of the above, in the embodiment it is possible to enable a user to select an arbitrarily value for the initial value Z0, to generate a stereoscopic image with characteristics according to preferences of users.

B. Second Embodiment

A configuration of a stereoscopic image generation apparatus D according to a second embodiment of the present invention will now be described. In the first embodiment, the synthesizing processing is performed for each pixel for one time to generate a stereoscopic image based on depth values Z of the pixels. In this embodiment the synthesizing processing includes two or more stages. It should be noted that like numerals of the image generation apparatus D according of the second embodiment are assigned to like elements of the image generation apparatus of the first embodiment, and description of the like elements is therefore omitted.

Figure 14:
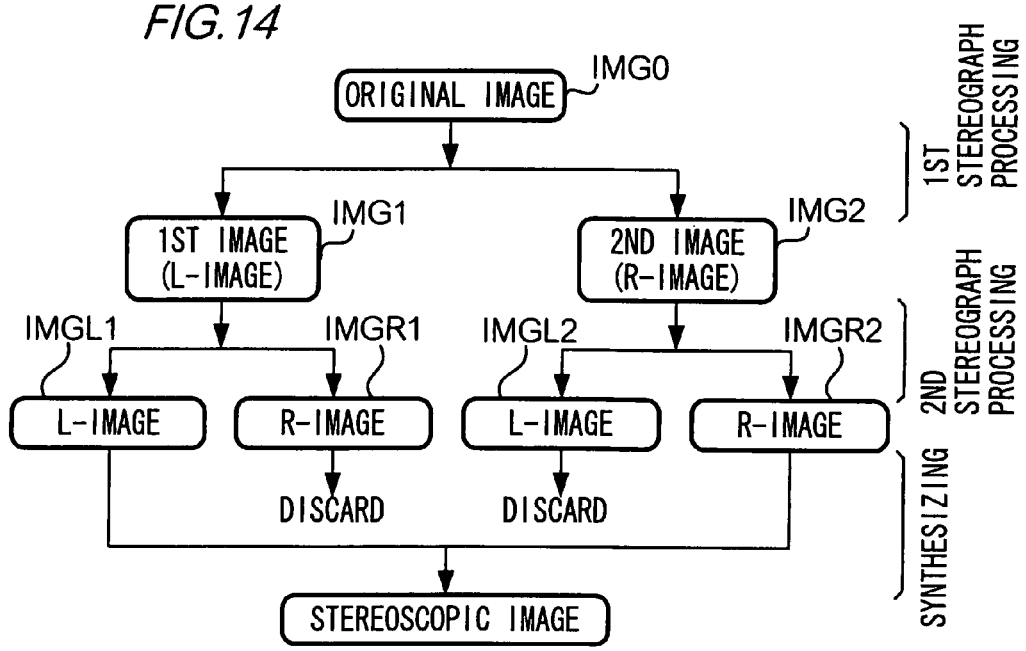
FIG. 14 illustrates an operation performed by a stereoscopic image generation apparatus according to the second embodiment of the present invention.

FIG. 14 shows an outline of operation performed by the stereoscopic image generation apparatus D of the second embodiment. As shown therein, the operation according to the second embodiment includes a stereograph processing (as of the first stage) to generate images IMG1 and IMG2 for the left and right eyes, respectively, from an original image IMG0, similary to the first embodiment. In the second embodiment, further stereograph processing is performed on the generated images IMG1 and IMG2 as new original images. Specifically, as shown in FIG. 14, CPU 10 performs a secondary stereograph processing on image IMG1 generated as an L-image generated based on original image IMG0, so as to generate an L-image IMGL1 and R-image IMGL2. In addition, CPU 10 performs a secondary stereograph processing on first image IMG1 which is generated as an image for the right eye from original image IMG0, so as to generate an L-image IMGR1 and R-image IMGR2. Next, L-image IMGL1 generated from image IMG1 and R-image IMGR2 generated from first image IMG2 are synthesized, to generate a stereoscopic image as a final product. R-image IMGR1 generated from image IMG1 and L-image IMGL2 generated from image IMG2 are discarded. However, it is possible to employ R-image IMGR1 and L-image IMGL1 as well as L-image IMGL1 and R-image, to generate a final product. In this case, the generated stereoscopic image may correspond to four viewpoints.

Operation shown in FIG. 14 will now be described in detail. CPU 10 generates the stereograph processing described in FIGS. 10 to 13 to generate L-image IMG1 and R-image IMG2, similary to the first embodiment. Next, a secondary stereograph processing is performed on first image IMG1, which can be regarded as an original image. Specifically, CPU 10 assigns head address ADleft of an area in which image data of the first image IMG1 to variable srcp is set in step Sa1 described in FIG. 10, and performs a secondary stereograph processing with the variable srcp, so as to generate L-image IMGL1 and R-image IMGR1. Similary, CPU 10 assigns head address ADright of an area in which image data of the first image IMG1 to variable srcp is set in step Sa1 described in FIG. 10, and performs a secondary stereograph processing with the variable srcp, so as to generate L-image IMGL2 and right eye image IMGR2. CPU 10 synthesizes L-image IMGL1 generated from image IMG1 and R-image IMGR2 generated from image IMG2 to generate a stereoscopic image in step Sd6, and displays the generated stereoscopic image in display 40 in step Sd7.

In a case that a quite large value is set for step value PLX which represents a step width of variable Zx, when generating L- and R-images via a single-stage stereograph processing according to the first embodiment, a defect of pixels appears easily in a stereoscopic image. This is because, for example, the pixel-crossing phenomenon appears in some pixels since the pixels in original image IMG0 have a great distance between them in L- and R-images. Problems relating to the pixel defect may be addressed if step value PLX is set to a small number. In this case, however, variation of a depth value Z of a pixel is necessarily limited in a very narrow range. As a result, a generated stereoscopic image can only provide a poor sense of depth to a viewer. Whereas in the second embodiment, the stereograph processing is performed twice even when step value PLX is set smaller in order to prevent a pixel defect. As a result, a generated stereoscopic image enables a viewer to perceive a natural sense of depth.

Although the second embodiment exemplifies a method of performing the stereograph processing twice to generate a final product, it is possible to adapt a frequency of the stereograph processing. For example, when the stereograph processing is performed three times, an operation according to the present invention is as described in the following. First, L- and R-images are generated based on left eye image IMGL1 shown in FIG. 14 and further L- and R-images are generated based on right eye image IMGR2 shown in FIG. 14. Next, L-image generated based on L-image IMGL1 and R-image generated based on R-image IMGR2 are synthesized to obtain a stereoscopic image as a final product.

C. Modified Examples

It is possible to modify the embodiments described above. Details of exemplified modifications will now be described. It is noted that the following modifications may be combined as required.

(1) In the first and second embodiments, descriptions are directed to binarize data element U of each color in a pixel Pix before adding to determine a pixel value G of the pixel Pix. However, it is possible to adapt other methods of calculating a pixel value G of each pixel. For example, it is possible to employ subpixels of other color components to generate a pixel value G. Also, it is possible to employ any of brightness, saturation, or luminosity of a pixel to generate a pixel value G of the pixel. It should be construed that any method of calculating a pixel value G of a pixel can be employed in the present invention if the calculation is performed based on a pixel included in an original image for generating a stereoscopic image.

In the above embodiments, the method including a process of calculating pixel values G of each pixel based on a data element U of each pixel is exemplified. It is possible, however, to omit the calculation of pixel values. Specifically, it is possible to store pixel values of pixels included in an original image IMG0 in a memory of the stereoscopic image generation apparatus in advance. Although in the above embodiments, an original image is made of two or more colors (i.e. it is a color image), it is possible to employ an image having white and black only (i.e. monochrome image). In this case, a grayscale of a pixel can be identified as a pixel value G. Simply put, a method of generating a stereoscopic image according to the invention does not necessarily include a process of calculating a pixel value G. In both of a case where the calculation of pixel values Gs are performed when generating a stereoscopic image and a case where pixel values G are provided in advance, a method of the present invention can be implemented in an apparatus having a storage unit for storing pixel values Gs.

In the above embodiments, the calculations of pixel values G and pixel data representing grayscale levels of pixels are performed in separate processes. Pixel data of an original image is employed to generate L- and R-images used in the synthesizing processing. In a case where a grayscale level of a pixel can be regarded as a pixel value G, for example a case where an original image is monochrome, pixel values G, as they are, are employed to generate L- and R-images.

(2) In the first and second embodiments, variable Zx is caused to increase or decrease in either a case where variable WHICH is changed or a case where the number of successive increases or decreases exceeds threshold N. It is possible to perform updating variable Zx in only the former case or in only the latter case. For example, variable Zx may be updated when the number of successive increases or decreases exceeds threshold N regardless of a change of variable WHICH. It is notable that the present invention may be adapted to other conditions such as whether an update of variable Zx is performed. Simply put, in the present invention a pixel value G of a pixel is determined based on a comparison(s) with a pixel value(s) of its neighboring pixel(s).

(3) In the first and second embodiments, original image data Dg is stored in storage unit 30 in advance. However, it is possible to adapt other methods of obtaining an original image including selection of a provider of the original image in the present invention. For example, the original image data Dg may be read out from a storage medium such as videotape or digital versatile disk (DVD), or received from a communication terminal via a network, to be provided for generating a stereoscopic image. It is noted that the original image is not limited to a static image. An original image is a moving image that is made by aligning static images in a certain order. A format of the original image is not limited. For example, it is possible to adapt image data generated by extending a data compressed with techniques of compressing moving images such as moving picture experts group (MPEG) images. In a case that a moving image is employed as an original image for a stereograph processing, processing shown in FIGS. 10-13 is performed for each of the static images included in the moving image.

(4) As shown in FIG. 2, in the first and second embodiments, subpixels Ps of blue (B), green (G), and red (R) comprise of a single pixel are aligned in an order of from negative to positive on a line. However it is possible to adapt other alignments of the subpixels. For example, an alignment order of from red (R), green (G), to blue (B) may be adapted in the first and second embodiments.

(5) In the first and second embodiments, a depth value Z of a target pixel is calculated based on whether a pixel value G of the target pixel P is big or small with respect to a pixel value G of a pixel lying next to the target pixel in a horizontal direction. However, it is possible to adapt other methods of selecting a neighboring pixel of a target pixel. For example, it is possible to calculate a depth value Z of a target pixel based on whether a pixel value G of the target pixel P is big or small with respect to a pixel value G of a pixel lying next to the target pixel in a vertical direction (Y-direction). In this case, similar processing of the first embodiment is performed. In this case it is necessary to store pixels values Gs of pixels lying in next selected line (and also previously selected line) in addition to pixels values G of pixels lying in a currently selected line, although pixel values G of pixels are calculated for each line in the first embodiment (6) In the first and second embodiments, in an apparatus for generating a stereoscopic image according to the present invention, a CPU executes a program(s) to perform functions described above. The functions may be performed by a hardware especially designed for image processing such as a DSP.

The invention claimed is:

1. An apparatus for generating a stereoscopic image based on an original image by synthesizing images for left and right eyes, the apparatus comprising:
    pixel value storing means for storing a pixel value for each of the pixels included in the original image;
    depth value storing means for storing a depth value for each of the plurality of pixels included in the original image;
    threshold storing means for storing a threshold;
    determining means for determining the depth value for each of the pixels included in the original image based on a comparison of pixel values between a pixel and at least one neighboring pixel, the determining means comprising:
        selecting means for sequentially selecting a plurality of pixels included in the original image in accordance with an arrangement of the plurality of pixels;
        changing means for changing the depth value of a pixel based on a comparison between pixel values of the selected pixel by the selecting means and an adjacent pixel of the selected pixel;
        means for determining whether a pixel value of the selected pixel by the selecting means is larger than a pixel value of an adjacent pixel lying in a prescribed direction;
        counting means for counting a number of pixels for which pixel values are determined to be larger than the pixel value of the selected pixel, the counted pixels lying in the prescribed direction; and
        comparing means for comparing the number counted by the counting means to the threshold stored in the threshold storing means, wherein the changing means changes the depth value stored in the depth value storing means based on a result of the comparison obtained by the comparing means, and
    stereograph means for generating a stereoscopic image based on the pixel values of the pixels determined by the determining means,
    wherein when the selected pixel is selected by the selecting means, the stereograph means performs a stereograph processing on the selected pixel based on a depth value of the selected pixel, which is stored in the depth value storing means.

2. The apparatus of claim 1, wherein each of the pixels includes a plurality of subpixels having different colors, the apparatus further comprising:
    subpixel value storing means for storing values of subpixels for each of the pixels; and
    calculating means for calculating a pixel value for each of the pixels based on a value of the subpixels for each of the pixels stored in the subpixel value storing means,
    wherein the pixel value storing means stores a pixel value calculated by the calculating means for each of the pixels.

3. The method of claim 2, wherein the calculating means binarizes a plurality of subpixels of a pixel and obtains a weighted average of the binarized values, to calculate a pixel value for the pixel based on the weighted average.

4. The apparatus of claim 3, wherein:
    each of the pixels includes subpixels of red, green, and blue;
    the calculating means puts a first weight on a binarized red subpixel of a pixel, a second weight on a binarized green subpixel of the pixel, and a third weight on a binarized blue subpixel of the pixel; and adds the weighted values, so as to calculate a pixel value of the pixel based on the added values; and
    the second weight is larger than the first weight, and the third weight is smaller than the first weight.

5. The apparatus of claim 1, wherein the changing means changes the depth value stored in the depth value storing means when the number obtained by the counting means exceeds threshold.

6. The apparatus of claim 1, further comprising an obtaining means for obtaining an initial value input by an input device, wherein the changing means sets the initial value obtained by the obtaining means as a depth value of a pixel which is first selected from the pixels lying in the prescribed direction by the selecting means.

7. The apparatus of claim 1, further comprising grayscale value storing means for storing a grayscale for each of the pixels included in the original image, wherein the stereograph means comprises:
    generating means for generating an image for left eyes in which each grayscale of target pixels in the original image is identical to a grayscale of a respective pixel in the generated image, the respective pixel lying in a same line as the target pixel, a distance between the target pixel and the respective pixel corresponding to a depth value of the target pixel in a first direction, and for generating an image for right eye in which each grayscale of target pixels in the original image is identical to a grayscale of a respective pixel in the generated image, the respective pixel lying in the same line as the target pixel, the distance between the target pixel and the respective pixel corresponding to a depth value of the target pixel in a second direction; and
    synthesizing means for synthesizing the images for left and right eyes generated by the generating means to generate a stereoscopic image.

8. The apparatus of claim 7, wherein:
    the generating means iterates generation of images for left and right eyes, wherein in each of the generation processes except for a first generation process, images for left and right eyes which have been generated in an immediately preceding generation process are used as an original image to generate images for left and right eyes images; and
    the synthesizing means synthesizes images for left and right eyes generated through multiple generation processes, to generate the stereoscopic image.

9. A non-transitory computer readable storing medium that stores a computer program for causing a computer to execute:
    storing a pixel value for each of the pixels included in the original image; determining a depth value for each of the pixels included in the original image based on a comparison between pixel values of the pixel and an adjacent pixel;
    sequentially selecting a plurality of pixels included in the original image in accordance with an arrangement of the plurality of pixels;
    determining whether a pixel value of a selected pixel is larger than a pixel value of an adjacent pixel lying in a prescribed direction;
    counting a number of pixels for which pixel values are determined to be larger than the pixel value of the selected pixel, the counted pixels lying in the prescribed direction;

comparing the number counted to a threshold;
changing a depth value of a pixel based on a result of the comparison between the number counted to the threshold;
performing stereograph processing on the selected pixel based on a depth value of the selected pixel; and
generating a stereoscopic image based on determined depth values of the pixels.

10. An apparatus for generating a stereoscopic image based on an original image by synthesizing images for left and right eyes, the apparatus comprising:
pixel value storing means for storing a pixel value for each of the pixels included in the original image;
a depth value storing means for storing a depth value for each of the pixels included in the original image;
a threshold storing means for storing a threshold;
determining means for determining the depth value for each of the pixels included in the original image based on a comparison of pixels values between a pixel and at least one neighboring pixel, the determining means comprising:
  selecting means for sequentially selecting a plurality of pixels included in the original image in accordance with an arrangement of the plurality of pixels;
  changing means for changing the depth value of a pixel based on a comparison between pixel values of the selected pixel by the selecting means and an adjacent pixel of the selected pixel;
  checking means for determining whether a pixel value of the selected pixel by the selecting means is smaller than a pixel value of an adjacent pixel lying in a prescribed direction;
  counting means for counting a number of pixels for which pixel values are determined to be smaller than the pixel value of the selected pixel by the checking means, the counted pixels lying in the prescribed direction;
  comparing means for comparing the number counted by the counting means to the threshold stored in the threshold storing means, wherein the changing means changes the depth value stored in the depth value storing means based on a result of the comparison obtained by the comparing means, and
  stereograph means for generating a stereoscopic image based on the pixel values of the pixels determined by the determining means,
  wherein when the selected pixel is selected by the selecting means, the stereograph means performs a stereograph processing on the selected pixel based on a depth value of the selected pixel, which is stored in the depth value storing means.

11. The apparatus of claim 10, wherein the changing means changes the depth value stored in the depth value storing means when the number obtained by the counting means exceeds the threshold.

12. The apparatus of claim 1, further comprising an obtaining means for obtaining an initial value input by an input device, wherein the changing means sets the initial value obtained by the obtaining means as a depth value of a pixel which is first selected from the counted pixels lying in the prescribed direction by the selecting means.

13. The apparatus of claim 10, further comprising an obtaining means for obtaining an initial value input by an input device, wherein the changing means sets the initial value obtained by the obtaining means as a depth value of a pixel which is first selected from the counted pixels lying in the prescribed direction by the selecting means.

14. The apparatus of claim 10, wherein each of the pixels includes a plurality of subpixels having different colors, the apparatus further comprising:
subpixel value storing means for storing values of subpixels for each of the pixels; and
calculating means for calculating a pixel value for each of the pixels based on a value of the subpixels for each of the pixels stored in the subpixel value storing means,
wherein the pixel value storing means stores a pixel value calculated by the calculating means for each of the pixels.

15. The apparatus of claim 10, further comprising grayscale value storing means for storing a grayscale for each of the pixels included in the original image, wherein the stereograph means comprises:
generating means for generating an image for left eyes in which each grayscale of target pixels in the original image is identical to a grayscale of a respective pixel in the generated image, the respective pixel lying in a same line as the target pixel, a distance between the target pixel and the respective pixel corresponding to a depth value of the target pixel in a first direction, and for generating an image for right eye in which each grayscale of target pixels in the original image is identical to a grayscale of a respective pixel in the generated image, the respective pixel lying in the same line as the target pixel, the distance between the target pixel and the respective pixel corresponding to a depth value of the target pixel in a second direction; and
synthesizing means for synthesizing the images for left and right eyes generated by the generating means to generate a stereoscopic image.

16. A non-transitory computer readable storing medium that stores a computer program for causing a computer to execute:
storing a pixel value for each of the pixels included in the original image; determining a depth value for each of the pixels included in the original image based on a comparison between pixel values of the pixel and an adjacent pixel;
sequentially selecting a plurality of pixels included in the original image in accordance with an arrangement of the plurality of pixels;
determining whether a pixel value of a selected pixel is smaller than a pixel value of an adjacent pixel lying in a prescribed direction;
counting a number of pixels for which pixel values are determined to be smaller than the pixel value of the selected pixel, the counted pixels lying in the prescribed direction;
comparing the number counted to a threshold;
changing a depth value of a pixel based on a result of the comparison between the number counted to the threshold;
performing stereograph processing on the selected pixel based on a depth value of the selected pixel; and
generating a stereoscopic image based on determined depth values of the pixels.

17. An apparatus for generating a stereoscopic image based on an original image by synthesizing images for left and right eyes, the apparatus comprising:
pixel value storing means for storing a pixel value for each of the pixels included in the original image;
determining means for determining a depth value for each of the pixels included in the original image based on a comparison of pixel values between a pixel and at least one neighboring pixel; and stereograph means for generating a stereoscopic image based on the pixel values of the pixels determined by the determining means, wherein the determining means determines whether a pixel value of a selected pixel by selecting means is larger than a pixel value of an adjacent pixel lying in a prescribed direction, to determine a variation in pixel values; and changing means changes the depth value stored in depth value storing means at which tendency of the selected pixel is reversed.

18. The apparatus of claim 17, wherein each of the pixels includes a plurality of subpixels having different colors, the apparatus further comprising:

subpixel value storing means for storing values of subpixels for each of the pixels; and calculating means for calculating a pixel value for each of the pixels based on a value of the subpixels for each of the pixels stored in the subpixel value storing means, wherein the pixel value storing means stores a pixel value calculated by the calculating means for each of the pixels.

19. The apparatus of claim 17, further comprising grayscale value storing means for storing a grayscale for each of the pixels included in the original image, wherein the stereograph means comprises:

generating means for generating an image for left eyes in which each grayscale of target pixels in the original image is identical to a grayscale of a respective pixel in the generated image, the respective pixel lying in a same line as the target pixel, a distance between the target pixel and the respective pixel corresponding to a depth value of the target pixel in a first direction, and for generating an image for right eye in which each grayscale of target pixels in the original image is identical to a grayscale of a respective pixel in the generated image, the respective pixel lying in the same line as the target pixel, the distance between the target pixel and the respective pixel corresponding to a depth value of the target pixel in a second direction; and synthesizing means for synthesizing the images for left and right eyes generated by the generating means to generate a stereoscopic image.

20. A non-transitory computer readable storing medium that stores a computer program for causing a computer to execute:

storing a pixel value for each of the pixels included in the original image; determining a depth value for each of the pixels included in the original image based on a comparison between pixel values of the pixel to an adjacent pixel;

selecting a pixel;

storing the depth value;

determining whether the pixel value of the selected pixel is larger than a pixel value of an adjacent pixel lying in a prescribed direction, to determine a variation in pixel values;

changing the depth value at which tendency for the selected pixel is reversed; and generating a stereoscopic image based on the determined depth values of the pixels.

21. The apparatus of claim 17, wherein the selecting means for sequentially selects a plurality of pixels included in the original image in accordance with an arrangement of the plurality of pixels;

the changing means changes the depth value of a pixel based on a comparison between pixel values of the selected pixel by the selecting means and an adjacent pixel of the selected pixel; and the stereograph means performs a stereograph processing on the selected pixel based on a depth value of the selected pixel stored in the depth value storing means, when the selected pixel is selected by the selecting means.

* * * * *